Patented May 1, 1923.

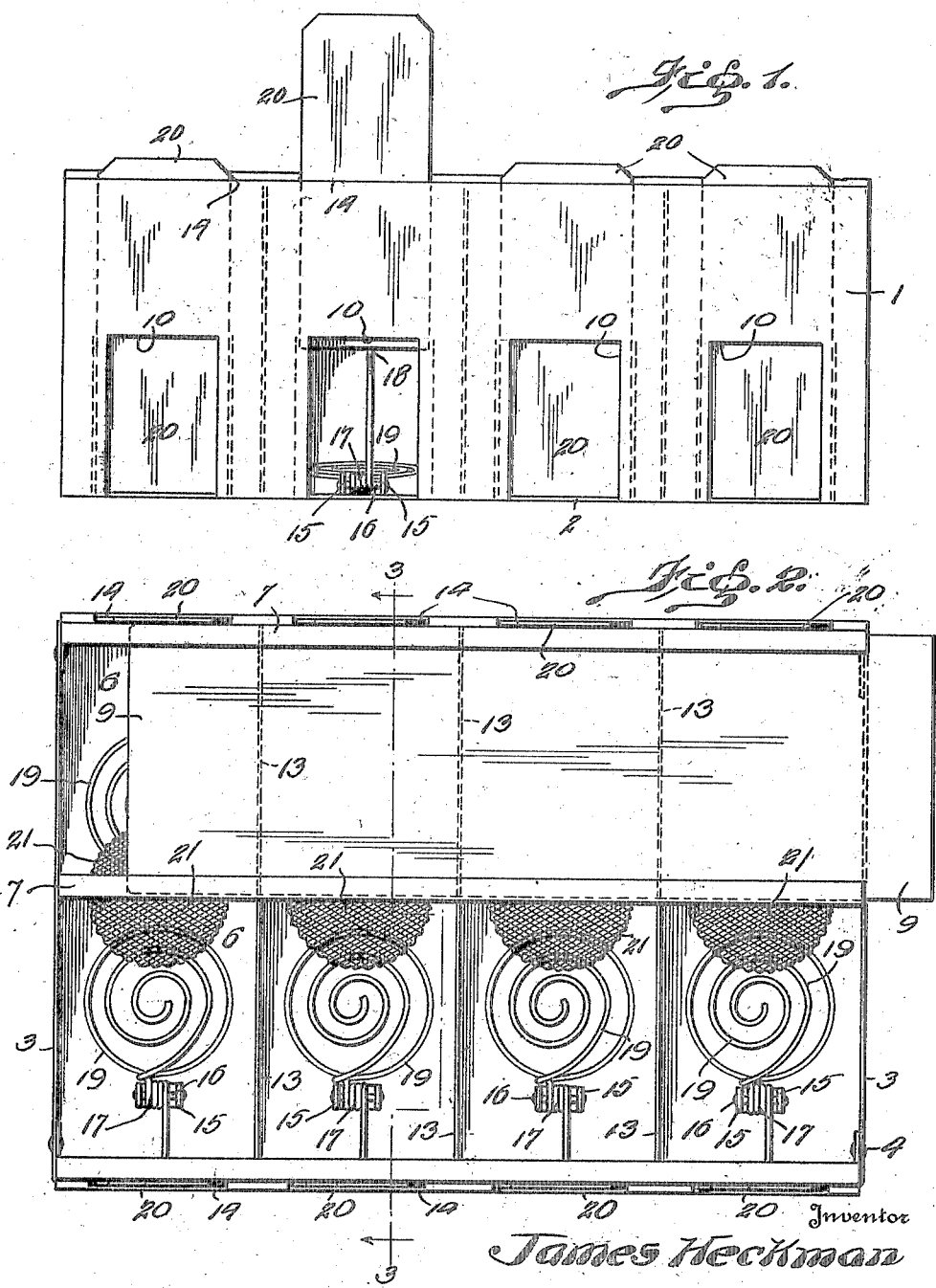

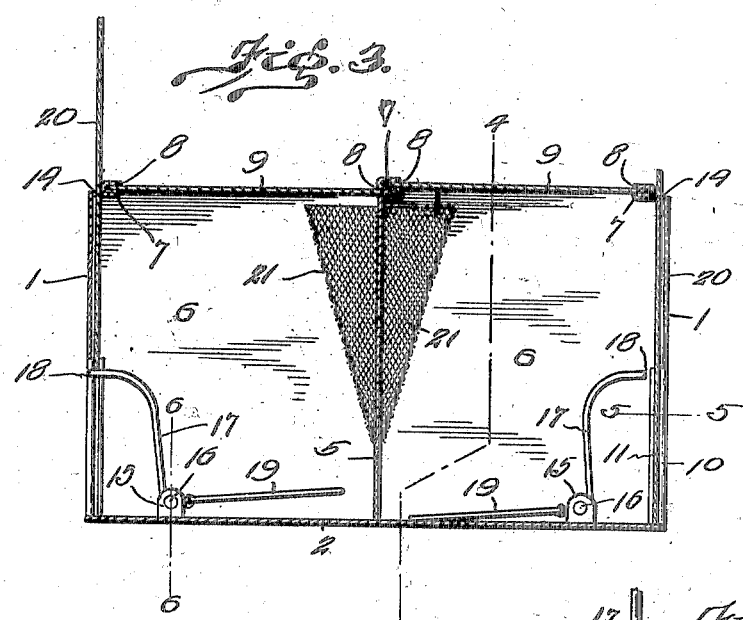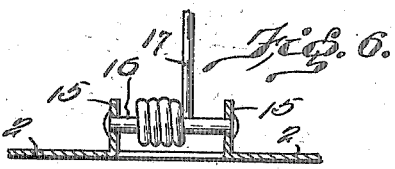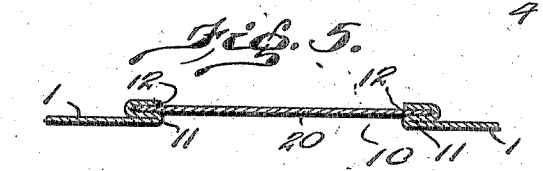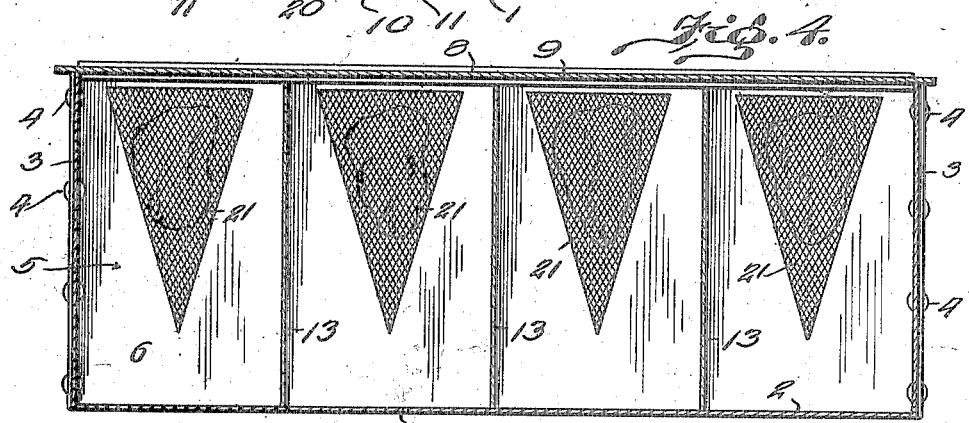

1,453,352

UNITED STATES PATENT OFFICE.

JAMES HECKMAN, OF ELECTRA, TEXAS, ASSIGNOR OF ONE-HALF TO SAM L. BARGSLEY, OF ELECTRA, TEXAS.

RAT AND MOUSE TRAP.

Application filed May 17, 1922. Serial No. 561,650.

*To all whom it may concern:*

Be it known that I, JAMES HECKMAN, a citizen of the United States, residing at Electra, in the county of Wichita and State of Texas, have invented a new and useful Rat and Mouse Trap, of which the following is a specification.

The object of my invention is to provide a novel rat and mouse trap including a plurality of traps arranged within the single casing and permitting of the springing of any one of the traps independent of other traps in the same casing; to provide means whereby it will not be necessary to re-bait the trap whenever a rodent is caught, and to provide novel means of springing the trap. I attain these and other objects of my invention by the apparatus disclosed in the accompanying drawings, in which—

Figure 1 is a side elevation of the trap with one of the trap doors open;

Fig. 2 is a top plan of the invention with one of the cover members removed and the other partially open;

Fig. 3 is a transverse section on line 3—3 of Fig. 2;

Fig. 4 is a longitudinal section on line 4—4 of Fig. 3;

Fig. 5 is a detail sectional view through one of the trap doors; and

Fig. 6 is a section on line 6—6 of Fig. 3.

Like numerals indicate like parts in each of the several views.

Referring to the accompanying drawings, I provide a suitable casing consisting of a base 2, sides 1, and ends 3. This casing is divided longitudinally by a suitable longitudinal partition 5, and is further divided transversely by a suitable number of transverse partitions 13 separating the casing into a series of trap chambers. In each of these chambers is provided a suitable wire bait-container 21 affixed to the wall or partition 5. Opening into each of the chambers is a doorway 10 adapted to be closed by the vertically slidable door 20 which is slidably mounted in the slot 14 of the casing as shown in Figs. 1 and 2. The sides 1 and the longitudinal partition 5 each terminates in an S-shaped top guide portion having guideways 8 in which the covers 9 are removably mounted, as shown in Figs. 2 and 3.

In each trap chamber I provide ears 15 on which are mounted the rod or bearing 16 which supports the trigger 17, the forwardly bent end 18 of which is releasably engaged by the bottom edge of the trap door 20, as shown at the left of Fig. 3. Trigger 17 has an inwardly extending trigger plate or coil 19 which is slightly raised from the base of floor 2 of the casing when the trap is set. The operation of the trap will be apparent from the drawings. When the mouse enters the trap, attracted by the bait in the bait-container 21, his weight on the trigger plate or coil 19 causes it to tilt downward from the position shown at the left of Fig. 3 to the position shown at the right of that view, thereby releasing the trigger end 18 from its position supporting the gravity-operated trap door 20 and allowing that door to drop down and close the trap. The covers 9 are removable for the purpose of placing new bait in the bait containers 21 or for removing the rodents that have been entrapped. As the bait is inaccessible to the animals the trap does not have to be baited over again each time a rat or mouse is caught. The trap is easily reset and is easily sprung when an animal enters the trap chamber. It also permits of the catching of a considerable number of rodents at a time.

What I claim is:

1. In a rat or mouse trap, the combination of a casing having a longitudinal partition and having a series of transverse partitions forming a series of trap chambers, the sides and longitudinal partition being bent in approximately S-shape in cross-section along their upper portion to form longitudinal guideways, a plurality of covers slidably mounted in said guideways enclosing the top of the series of trap chambers, vertically slidable gravity operated trap doors for each of the said trap chambers, and triggers releasably engaging the bottom edges of the gravity operated trap doors, said triggers being operated by the weight of the animal entering the trap.

2. In a rat and mouse trap having a plurality of trap chambers, independent covers to said chambers, the roof portion of the trap including a central partition crimped in S-shape to form guideways for two independent covers, slots in the roof of the trap, vertically slidable doors mounted in said slots, triggers arranged to hold said doors normally in raised position and to release and drop the doors upon receiving the weight of an animal, substantially as described and shown.

JAMES HECKMAN.